No. 630,641. Patented Aug. 8, 1899.
C. B. ALBREE.
CLAMP FOR PIPES, SHAFTS, &c.
(Application filed June 24, 1898.)
(No Model.)
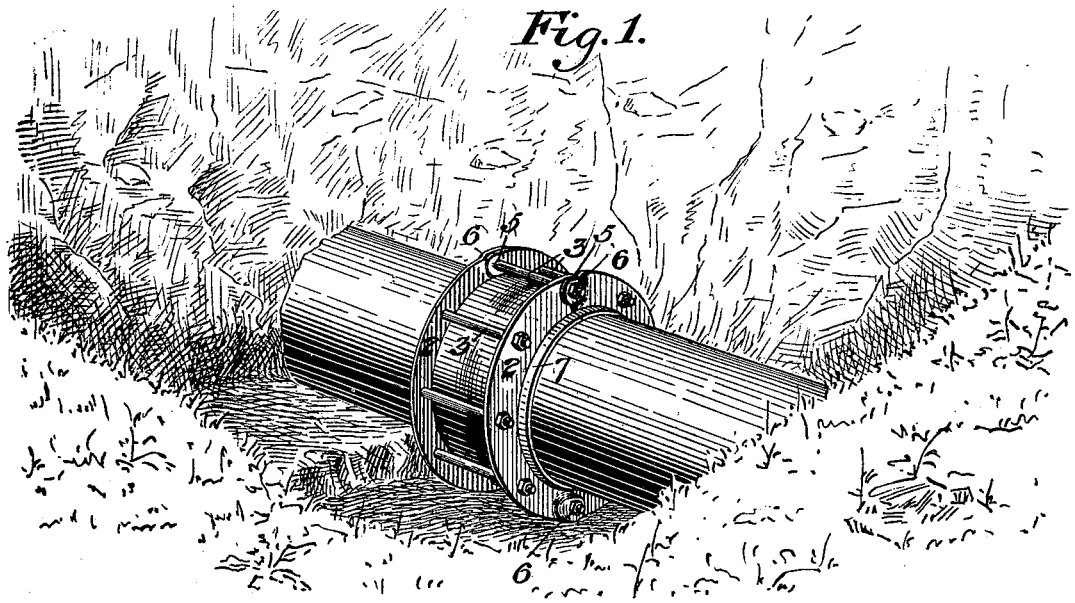
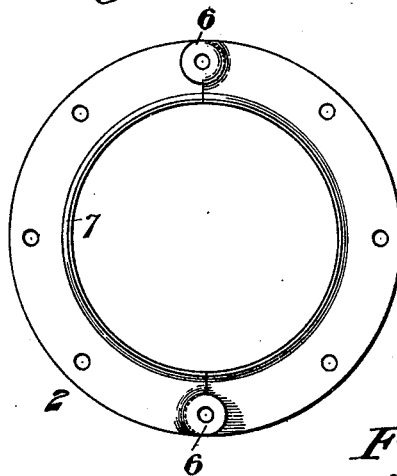
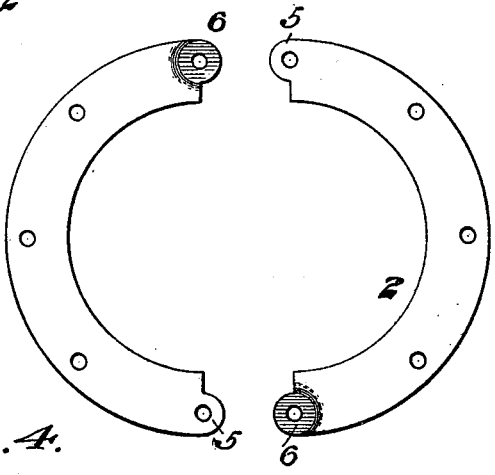
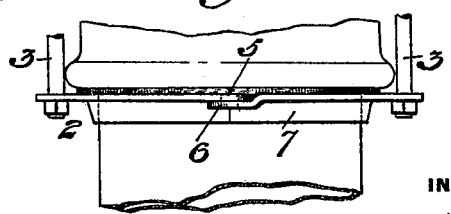
WITNESSES
INVENTOR
Chester B. Albree
by Bakewell & Bakewell
his attys.

UNITED STATES PATENT OFFICE.

CHESTER B. ALBREE, OF ALLEGHENY, PENNSYLVANIA.

CLAMP FOR PIPES, SHAFTS, &c.

SPECIFICATION forming part of Letters Patent No. 630,641, dated August 8, 1899.

Application filed June 24, 1898. Serial No. 684,355. (No model.)

*To all whom it may concern:*

Be it known that I, CHESTER B. ALBREE, of Allegheny, in the county of Allegheny and State of Pennsylvania, have invented a new and useful Improvement in Clamps for Pipes, Shafts, &c., of which the following is a full, clear, and exact description, reference being had to the accompanying drawings, forming part of this specification, in which—

Figure 1 is a perspective view of a gas-pipe joint provided with my improved split clamp. Fig. 2 is an outer face view of one of the rings forming the clamp. Fig. 3 is an inner face view of the ring with its two parts separated. Fig. 4 is an edge or top plan view of one of the rings in place, and Fig. 5 is a broken end elevation showing the offset lug.

My invention relates to the split clamps employed in connection with pipes or shafts for compressing a gasket against a compression-surface thereon; and it is designed to provide an improved construction of the ring-joint, whereby the joint is strengthened and prevented from bending or bowing outwardly, so as to prevent the desired compression of the gasket at such point.

In the drawings, in which I show my device as employed for a packing-clamp at a pipe-joint, 2 2 represent the two rings forming the clamp, these being drawn toward each other by the connecting-bolts 3. Each of these rings consists of two parts, each similar to the other and having at one end a projecting lip 5 in the plane of the ring. At the other end each ring portion is provided with an outer lip or lug 6, which is struck up or offset from the body a distance substantially equal to the thickness of the ring-body. This lip or lug is not split away from the body, but is joined to it by an integral curved ribbed portion, which serves to strengthen this portion rather than weaken it. The lips or lugs at both ends are provided with bolt-holes, and when the two parts are matched together about a pipe or shaft, one part being reversed in position to that of the other, the bolt-holes are brought into registry and bolts passed therethrough, so as to draw the two rings toward each other and compress the gaskets.

The parts of the rings are preferably made by rolling a suitable shape with a flange 7 at one edge thereof and then cutting this shape into suitable lengths and bending them into semicircular form. The end portions are then cut to form the lugs or lips, and the lug at one end is struck up or offset sidewise by means of dies or hammer.

The advantages of my invention result from the use of the lug which is struck up from the body of the metal, the inner face and the adjacent part of the side face upon the ring next to the offset lug being flush at the joint, since an even uniform pressure is obtained upon all parts of the gasket, and the lug at the joint is prevented from bending or other distortion.

The ring may be split at only one point or may be formed in more than two parts, and other variations in the form of the ring and the joint may be made without departing from my invention.

I claim—

1. A split clamp of forgeable metal, consisting of sections, each having at its joint with the other, a circular struck-up lug, offset sidewise from the body, said lug being connected with the body by a continuous bent rib portion extending along that part of the offset adjoining the body, whereby a flush face is obtained at the joints, and the joints can open and close in one and the same plane; substantially as described.

2. A split clamp of forgeable metal, consisting of sections, each having at its joint with the other, a circular struck-up lug, offset sidewise from the body, and extending only partly across the body, said lug being connected with the body by a continuous bent rib portion extending along that part of the offset adjoining the body, whereby a flush face is obtained at the joints, and the joints can open and close in one and the same plane; substantially as described.

In testimony whereof I have hereunto set my hand.

CHESTER B. ALBREE.

Witnesses:
F. E. GAITHER,
G. B. BLEMMING.